(12) United States Patent
Fujimoto et al.

(10) Patent No.: US 9,321,668 B2
(45) Date of Patent: Apr. 26, 2016

(54) MANUFACTURING METHOD FOR GLASS MOLDED BODY AND MANUFACTURING APPARATUS FOR GLASS MOLDED BODY

(71) Applicant: HOYA CORPORATION, Tokyo (JP)

(72) Inventors: Tadayuki Fujimoto, Hachioji (JP); Kiyokane Yamazaki, Akishima (JP); Yasumasa Wada, Ome (JP)

(73) Assignee: HOYA CORPORATION, Tokyo (JP)

( * ) Notice: Subject to any disclaimer, the term of this patent is extended or adjusted under 35 U.S.C. 154(b) by 29 days.

(21) Appl. No.: 14/368,101

(22) PCT Filed: Dec. 27, 2012

(86) PCT No.: PCT/JP2012/083933
§ 371 (c)(1),
(2) Date: Jun. 23, 2014

(87) PCT Pub. No.: WO2013/105452
PCT Pub. Date: Jul. 18, 2013

(65) Prior Publication Data
US 2014/0311185 A1     Oct. 23, 2014

(30) Foreign Application Priority Data
Jan. 10, 2012  (JP) .................................. 2012-001988

(51) Int. Cl.
*C03B 11/02* (2006.01)
*C03B 11/12* (2006.01)

(52) U.S. Cl.
CPC ................. *C03B 11/02* (2013.01); *C03B 11/12* (2013.01); *C03B 2215/06* (2013.01);

(Continued)

(58) Field of Classification Search
CPC .............................. C03B 11/02; C03B 11/12
See application file for complete search history.

(56) References Cited

U.S. PATENT DOCUMENTS 5,346,522 A * 9/1994 Komiyama ............. C03B 11/08
65/102
5,616,161 A * 4/1997 Morikita .................. C03B 11/08
425/407

FOREIGN PATENT DOCUMENTS

JP       A-01-157425       6/1989
JP       B2-07-029779      4/1995

(Continued)

OTHER PUBLICATIONS

Machine Translation of JP 2010-120788.*

(Continued)

*Primary Examiner* — Russell Kemmerle, III
(74) *Attorney, Agent, or Firm* — Oliff PLC

(57) ABSTRACT

Provided are a manufacturing method for a glass molded body and a manufacturing apparatus for a glass molded body, which employs the manufacturing method. The manufacturing method includes the steps of: heating molds each containing a glass material; press-molding the glass material; and cooling the press-molded glass material. The heating step includes: heating the molds with heating members arranged on both sides of a conveying direction of a support for conveying the molds in one direction; and conveying the two molds through rotation of the support or the like so as to reverse, at least once, an arrangement order of the two molds, which are arranged on a supporting surface of the support conveying the molds between the heating members, with respect to the conveying direction of the support.

9 Claims, 5 Drawing Sheets

(52) U.S. Cl.
CPC ........ *C03B 2215/07* (2013.01); *C03B 2215/48* (2013.01); *C03B 2215/72* (2013.01); *C03B 2215/80* (2013.01); *Y02P 40/57* (2015.11)

(56) References Cited

FOREIGN PATENT DOCUMENTS

| JP | A-2006-240913 | 9/2006 |
|---|---|---|
| JP | A-2006-282421 | 10/2006 |
| JP | A-2007-001854 | 1/2007 |
| JP | A-2008-056532 | 3/2008 |
| JP | B2-4353954 | 10/2009 |
| JP | A-2010-120788 | 6/2010 |

OTHER PUBLICATIONS

Machine Translation of JP 2006-240913.*

Apr. 16, 2013 International Search Report issued in International Application No. PCT/JP2012/083933.

* cited by examiner

MANUFACTURING METHOD FOR GLASS MOLDED BODY AND MANUFACTURING APPARATUS FOR GLASS MOLDED BODY

TECHNICAL FIELD

The present invention relates to a manufacturing method for a glass molded body and a manufacturing apparatus for a glass molded body.

BACKGROUND ART

As apparatus for manufacturing a glass molded body such as an optical glass lens, there are known apparatus for sequentially performing heating, pressing, and cooling steps and the like while conveying, in one direction, molds each containing a glass material for press molding (Patent Literatures 1 to 4 and the like). In each of these apparatus, the molds are conveyed in one direction under a state in which the molds are arranged on supports.

Note that, in the apparatus disclosed in Patent Literature 2, a shielding member for shielding thermal energy emitted from heating means for heating the molds is interposed between the heating means and the molds or between the heating means and the supports for supporting the molds, and the range shielded by the shielding member is adjustable. When such a structure as described above is adopted, the range shielded by the shielding member is adjusted for each of a plurality of molds, and the temperature of each mold is adjusted to an appropriate temperature, thereby being capable of stably performing high-accuracy molding.

Further, in the apparatus disclosed in Patent Literature 3, shielding means for partially shielding the molds from being irradiated with thermal energy emitted from heating means for heating the molds is provided at an arbitrary position between the heating means and the molds. When such a structure as described above is adopted, slight temperature difference among a plurality of molds, which is difficult to be controlled only by adjusting the power output of the heating means, can be eliminated, and hence high-accuracy molded bodies can be manufactured efficiently and stably by the plurality of molds under the same temperature environment.

In addition, the apparatus disclosed in Patent Literature 4 has a structure in which the molds are arranged on a surface of a table that can be rotationally driven and heat generating elements surrounding the outer peripheral part of the molds are provided. When such a structure as described above is adopted, the molds can be heated rapidly and uniformly in a predetermined period of time and a period of time necessary for manufacturing glass molded bodies can be shortened.

CITATION LIST

Patent Literature

[PTL 1] JP 07-29779 B (claim 1, FIG. 1, etc.)
[PTL 2] JP 2006-282421 A (claim 1, paragraph 0023, FIG. 1, etc.)
[PTL 3] JP 2008-56532 A (claim 1, paragraph 0021, FIG. 1, etc.)
[PTL 4] JP 4353954 B (claim 3, paragraph 0015, FIG. 5, etc.)

SUMMARY OF INVENTION

Technical Problem

However, in the apparatus using any of such a shielding member and such shielding means as disclosed in Patent Literatures 2 and 3, respectively, the efficiency of thermal energy to be utilized for heating molds reduces. Further, the apparatus disclosed in Patent Literature 4 has a structure in which molds are arranged on a surface of a table that can be rotationally driven and heat generating elements surrounding the outer peripheral part of the molds are arranged, but only one mold can be subjected to a heating process with the heat generating elements. That is, only one mold can be arranged on the table (support), and hence it is difficult to improve further the production amount per unit time.

On the other hand, when glass molded bodies are produced in mass by performing each step while conveying molds in one direction as exemplified in Patent Literatures 1 to 4 and the like, it is important that the quality and accuracy of each of the glass molded bodies be ensured, and that quality fluctuation between the glass molded bodies be small. Further, in order to suppress the quality fluctuation, it is necessary that the degree of temperature difference between the molds be small when the molds are subjected to the heating process.

Particularly when glass molded bodies having significant difference in thickness between the central part and the peripheral part, such as concave lenses, or glass molded bodies having a relatively large outer diameter (for example, an outer diameter of 30 mm or more) are produced by press molding, slight temperature difference (1° C. to 5° C.) between molding surfaces of molds sometimes causes an error in the shape of each molded body to the degree of one to four Newton rings.

The present invention has been made in view of the above-mentioned circumstances, and has an object to provide a manufacturing method capable of achieving higher productivity and higher efficiency in heating each mold, and reducing temperature fluctuation between the molds, thereby yielding high-accuracy glass molded bodies, and to provide a manufacturing apparatus for a glass molded body.

Solution to Problem

The above-mentioned object is achieved by the following aspects of the present invention.

That is, according a first aspect of the present invention, there is provided a manufacturing method for a glass molded body, including at least the steps of: heating a plurality of molds each containing a glass material for molding to soften the glass material; press-molding the softened glass material; and cooling the press-molded glass material, the heating, the press-molding, and the cooling being performed while holding the plurality of molds with a support and conveying the plurality of molds in a constant direction, the heating including: heating the plurality of molds, which are arranged along a conveying direction of the support, with heating members arranged so as to be able to heat the plurality of molds from both sides of the conveying direction; and conveying the plurality of molds so as to reverse an arrangement order of the plurality of molds, which are arranged on the support, with respect to the conveying direction at least once.

According to a second aspect of the present invention, there is provided a manufacturing method for a glass molded body, including at least the steps of: heating a plurality of molds each containing a glass material for molding to soften the glass material; press-molding the softened glass material; and cooling the press-molded glass material, the heating, the press-molding, and the cooling being performed while holding the plurality of molds with a support and conveying the plurality of molds in a constant direction, the cooling including: cooling the glass material contained in each of the plurality of molds, which are arranged along a conveying direction of the support; and conveying the plurality of molds so as to reverse an arrangement order of the plurality of molds, which are arranged on the support, with respect to the conveying direction at least once.

In one embodiment of the manufacturing method for a glass molded body according to the first and second aspects of the present invention, it is preferred that the plurality of molds be two molds arranged on the support, and that the manufacturing method further include rotating the support by 180 degrees with respect to the conveying direction so as to reverse the arrangement order of the two molds with respect to the conveying direction.

In another embodiment of the manufacturing method for a glass molded body according to the first and second aspects of the present invention, it is preferred that the reversing the arrangement order of the plurality of molds with respect to the conveying direction at least once be carried out in both the heating and the cooling.

In another embodiment of the manufacturing method for a glass molded body according to the first and second aspects of the present invention, it is preferred that the reversing the arrangement order of the plurality of molds, which are arranged on the support, with respect to the conveying direction include rotating the support holding the plurality of molds in a horizontal direction under a state in which the support is spaced away from support conveying means for conveying the support.

In another embodiment of the manufacturing method for a glass molded body according to the first and second aspects of the present invention, it is preferred that the glass molded body be an optical device having a concave shape.

According to one aspect of the present invention, there is provided a manufacturing apparatus for a glass molded body, including at least: a heating part for heating a mold to soften a glass material contained in the mold; a press-molding part for press-molding the softened glass material; a cooling part for cooling the press-molded glass material; a support having a supporting surface for supporting a plurality of the molds thereon; and support conveying means for sequentially conveying the support to the heating part, the press-molding part, and to the cooling part, in which: the plurality of molds supported on the supporting surface are arranged along a conveying direction of the support; the heating part includes heating members arranged along both sides of the conveying direction of the support so as to be able to heat the plurality of molds from both the sides of the conveying direction of the support; and the support is rotationally movable so as to reverse an arrangement order of the plurality of molds, which are supported on the supporting surface of the support, with respect to the conveying direction.

In one embodiment of the manufacturing apparatus for a glass molded body according to the one aspect of the present invention, it is preferred that the mold be two molds arranged on the supporting surface of the support at a forward side of the support in the conveying direction and a backward side of the support in the conveying direction, and that the support be rotatable by 180 degrees with respect to the conveying direction so as to reverse the arrangement order of the two molds with respect to the conveying direction.

In another embodiment of the manufacturing apparatus for a glass molded body according to the one aspect of the present invention, it is preferred that the manufacturing apparatus for a glass molded body further include a rotational movement mechanism for rotating the support by 180 degrees with respect to the conveying direction of the support so as to reverse the arrangement order of the plurality of molds, which are arranged on the support, with respect to the conveying direction.

In another embodiment of the manufacturing apparatus for a glass molded body according to the one aspect of the present invention, it is preferred that the rotational movement mechanism be configured to rotate the support holding the plurality of the molds in a horizontal direction under a state in which the support is spaced away from the support conveying means.

In another embodiment of the manufacturing apparatus for a glass molded body according to the one aspect of the present invention, it is preferred that the support conveying means be a rotational table rotatable intermittently in one direction, that the support be a plurality of supports arranged at an outer peripheral side of an upper surface of the rotational table along a rotating direction of the rotational table, and that the heating part, the press-molding part, and the cooling part be at least arranged in the stated order along the rotating direction of the rotational table.

In another embodiment of the manufacturing apparatus for a glass molded body according to the one aspect of the present invention, it is preferred that the manufacturing apparatus for a glass molded body be used for manufacturing a glass lens having a concave shape.

Advantageous Effects of Invention

According to the aspects of the present invention, it is possible to provide the manufacturing method capable of achieving higher productivity and higher efficiency in heating each mold, and reducing temperature fluctuation between the molds, thereby yielding high-accuracy glass molded bodies, and to provide the manufacturing apparatus for a glass molded body.

Figure 1:
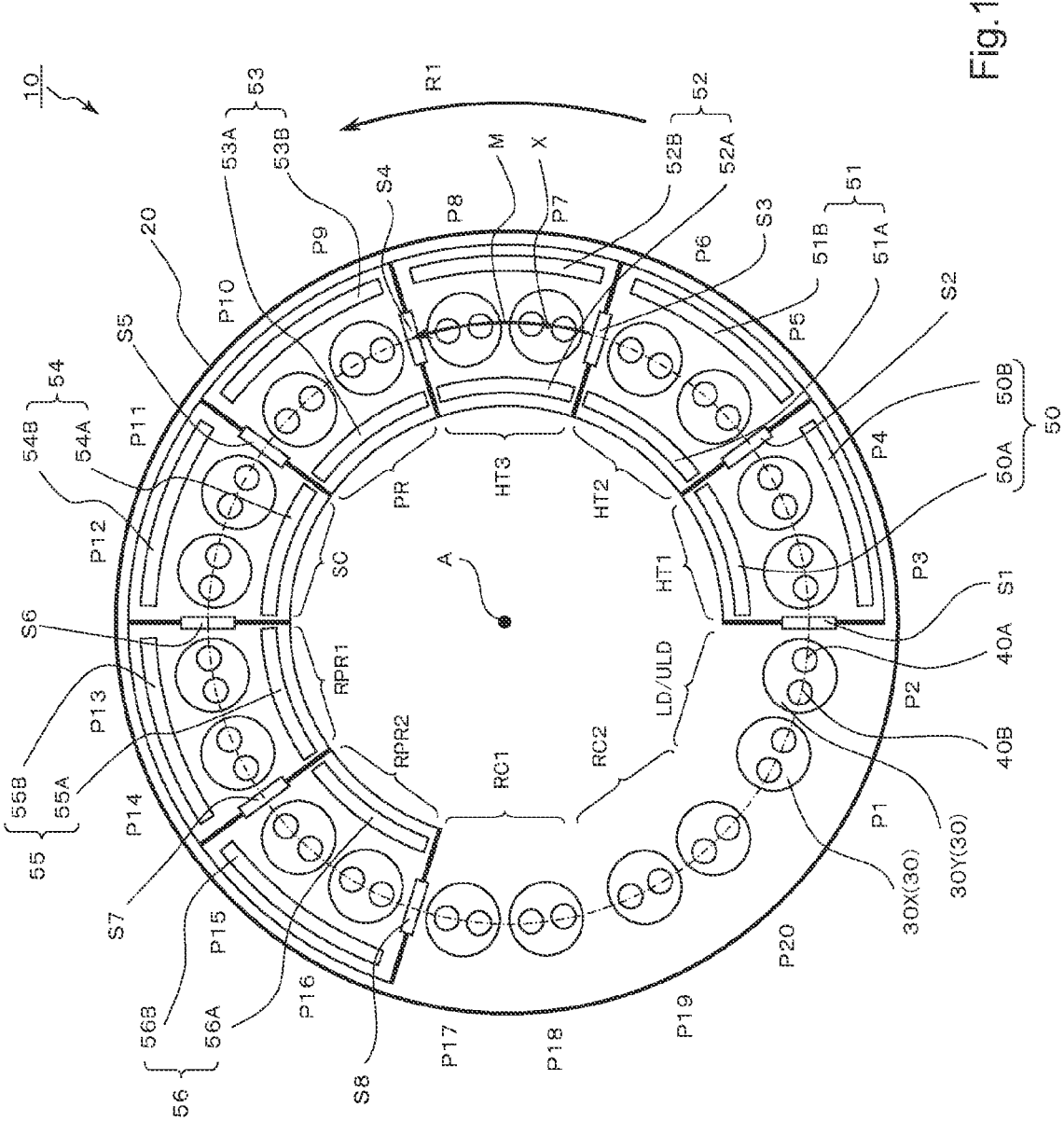
FIG. 1 is a schematic plan view illustrating one example of a manufacturing apparatus for a glass molded body according to an embodiment of the present invention.

DESCRIPTION OF EMBODIMENTS (Manufacturing Method for Glass Molded Body)

In a manufacturing method for a glass molded body according to an embodiment of the present invention, a glass molded body is manufactured, while holding a plurality of molds each containing a glass material for molding with a support and conveying the plurality of molds in a constant direction, thorough at least: a heating step of heating the molds to soften the glass material; a press-molding step of press-molding the softened glass material; and a cooling step of cooling the press-molded glass material. In this case, the heating step involves heating the plurality of molds, which are arranged along a conveying direction of the support, with heating members arranged so as to be able to heat the molds from both sides of the conveying direction. Further, the cooling step involves cooling the glass material contained in each of the plurality of molds arranged along the conveying direction of the support. In addition, in at least one step selected from the heating step and the cooling step, the plurality of molds are conveyed so as to reverse an arrangement order of the plurality of molds, which are arranged on the support, with respect to the conveying direction at least once.

In the manufacturing method for a glass molded body of this embodiment, the heating step, the press-molding step, the cooling step, and the like are performed by using the plurality of molds as a set while conveying the support holding the plurality of molds. Thus, the manufacturing method for a glass molded body of this embodiment is more highly productive in comparison to such a related-art manufacturing method for a glass molded body in which only one mold is arranged on one support as exemplified in Patent Literature 4. Further, in the manufacturing method for a glass molded body of this embodiment, it is not necessary to use such a shielding member and such shielding means as disclosed in Patent Literatures 2 and 3, respectively, and hence the manufacturing method is highly efficient in heating.

Note that, in the description below, the case in which an operation of reversing the arrangement order of the plurality of molds arranged on the support with respect to the conveying direction at least once is carried out in the heating step is denoted as a first embodiment, the case in which the operation is carried out in the cooling step is denoted as a second embodiment, and the case in which one or both of the first embodiment and the second embodiment are referred to is simply denoted as this embodiment. Further, unless otherwise specified, the description below is based on the premise that a total of two molds are arranged on the supporting surface of the support for conveying the molds in one direction, specifically, one mold is arranged at the forward side of the support in the conveying direction (hereinafter sometimes abbreviated as "forward side") and the other one is arranged at the backward side of the support in the conveying direction (hereinafter sometimes abbreviated as "backward side").

Herein, in the heating step, the two molds held by the support is heated with heating members arranged along both sides of the conveying direction of the support so as to be able to heat the two molds from both sides of the conveying direction of the support.

This means that the mold arranged at the forward side first enters together with the support into a heating area positioned between the heating members arranged along both sides of the conveying direction of the support and the mold arranged at the backward side subsequently enters therein. Herein, the mold arranged at the forward side has a longer cumulative heating time than the mold arranged at the backward side during a period in which the molds are conveyed in the heating area, and hence the mold arranged at the forward side has a higher temperature than the mold arranged at the backward side. However, it takes the same period of time for the mold arranged at the forward side and the mold arranged at the backward side to pass through the heating area. Thus, when only the heating time is taken into consideration, the temperature of the mold arranged at the forward side and the temperature of the mold arranged at the backward side are supposed to be eventually equal at the time when both molds have completely passed through the heating area.

Similarly, in the cooling step as well, the mold arranged at the forward side has a longer cumulative cooling time than the mold arranged at the backward side during a period in which the molds are conveyed in the cooling area, and hence the mold arranged at the forward side has a lower temperature than the mold arranged at the backward side. However, it takes the same period of time for the mold arranged at the forward side and the mold arranged at the backward side to pass through the cooling area. Thus, when only the cooling time is taken into consideration, the temperature of the mold arranged at the forward side and the temperature of the mold arranged at the backward side are supposed to be eventually equal at the time when both molds have completely passed through the cooling area.

However, when the mold arranged at the forward side and the mold arranged at the backward side that have entered the heating area stop at respective predetermined positions and are subjected to various kinds of processes such as the heating step, the mold arranged at the forward side undergoes a thermal influence of the area located in the forward side in the traveling direction, and the mold arranged at the backward side undergoes a thermal influence of the area located in the backward side in the traveling direction. The same holds true for the mold arranged at the forward side and the mold arranged at the backward side that have entered the cooling area. Further, in both areas adjacent, in the traveling direction, to the heating area in which the heating step is performed and both areas adjacent, in the traveling direction, to the cooling area in which the cooling step is performed, different steps are performed, and hence different temperatures to a certain degree need to be set in each area. Thus, the temperature difference between the mold arranged at the forward side and the mold arranged at the backward side is not eliminated because each mold is conveyed from the area in which a step is performed to the area in which another step is performed while the temperature difference is maintained.

Such temperature difference between the molds may cause quality fluctuation between a glass molded body produced in the mold arranged at the forward side and a glass molded body produced in the mold arranged at the backward side. For example, when a press-molding step is performed simultaneously with respect to the mold arranged at the forward side and the mold arranged at the backward side, a glass material contained in the mold arranged at the forward side has a relatively higher temperature (a relatively lower viscosity) than a glass material contained in the mold arranged at the backward side, and hence difference in shape accuracy (including thickness accuracy and transfer accuracy) between the resultant glass molded bodies is liable to occur.

However, in the manufacturing method for a glass molded body of the first embodiment, the two molds arranged on the supporting surface of the support are moved in the area between the heating members arranged along both sides of the conveying direction of the support (in the heating area) so that the arrangement order of the two molds with respect to the conveying direction of the support is reversed at least once. That is, the mold arranged at the forward side, which is relatively likely to be heated in the heating area, is arranged to the backward side, and the mold arranged at the backward side, which is relatively less likely to be heated in the heating area, is arranged to the forward side, thereby being able to further reduce temperature fluctuation between the two molds arranged on the supporting surface of one support.

Further, in the manufacturing method for a glass molded body of the second embodiment, the two molds arranged on the supporting surface of the support are moved in the cooling area so that the arrangement order of the two molds with respect to the conveying direction of the support is reversed at least once. That is, the mold arranged at the forward side, which is relatively likely to be cooled in the cooling area, is arranged to the backward side, and the mold arranged at the backward side, which is relatively less likely to be cooled in the cooling area, is arranged to the forward side, thereby being able to further reduce temperature fluctuation between the two molds arranged on the supporting surface of one support.

Note that, a similar effect may also be realized by, for example, extremely reducing the conveying speed of the support or by adopting a heating area having an elongate shape and a cooling area having an elongate shape. However, even if any of the both is adopted, it takes a much longer period of time to complete the heating step and the cooling step. In addition, a manufacturing apparatus for a glass molded body employing the latter method is upsized. Thus, these methods are inferior in practical use in comparison to the manufacturing method for a glass molded body of this embodiment.

Note that, a method of moving the two molds arranged on the supporting surface of the support so that the arrangement order of the two molds with respect to the conveying direction of the support is reversed at least once when the two molds are conveyed to the heating area to undergo the heating process and/or when the two molds are conveyed to the cooling area to undergo the cooling process is not particularly limited. The following methods can be exemplified. That is, there is exemplified (1) a method involving holding a mold arranged at the forward side and a mold arranged at the backward side with each arm whose temperature is controlled to such a degree that heat is not removed from a heated mold and extra heat is not applied to a cooled mold, and rearranging the mold arranged at the backward side to the forward side substantially simultaneously with rearranging the mold arranged at the forward side to the backward side. Besides, there is exemplified (2) a method involving rotating a support by 180 degrees with respect to the conveying direction of the support under the state in which two molds are placed on the support, thereby reversing the arrangement order of the two molds supported on the supporting surface of the support with respect to the conveying direction of the support when the two molds are conveyed to the heating area to undergo the heating process and/or when the two molds are conveyed to the cooling area to undergo the cooling process. Note that, from the viewpoint of downsizing and simplifying the structure of the manufacturing apparatus for a glass molded body utilizing the manufacturing method for a glass molded body of this embodiment, it is more preferred to adopt the method shown in the above-mentioned item (2) rather than the method shown in the above-mentioned item (1). Further, when the method shown in the above-mentioned item (2) is carried out, for example, the support holding the two molds can be rotated in the horizontal direction under a state in which the support is spaced away from support conveying means for conveying the support.

Further, the structure of the heating members is not particularly limited as long as the heating members are structured along both sides of the conveying direction of the support so as to be able to heat the two molds from both sides of the conveying direction of the support. As the heating members, it is preferred that individual heaters structuring the heating members have substantially the same heat generating amount, and that the heaters be arranged along both sides of the conveying direction of the support so as to be substantially line-symmetric with respect to the conveying direction. Note that, the shape of each heater is not particularly limited, and the heater may have a simple shape such as a rod-like shape or a flat plate-like shape and may also have a plate-like shape having, for example, a sine wave shape, a rectangular wave shape, or a triangular wave shape in cross section.

The manufacturing method for a glass molded body of this embodiment can be utilized for manufacturing any kind of glass molded body as long as the glass molded body can be manufactured by press molding using a mold. It is preferred that the manufacturing method for a glass molded body of this embodiment be used for manufacturing a glass lens that requires high shape accuracy and high quality. Further, as in the manufacturing method for a glass molded body of this embodiment, in a method of performing the heating step, the press-molding step, the cooling step, and the like by using two molds as a set while conveying the support having the two molds arranged on its supporting surface, as a glass lens having a larger diameter is produced, the degree of temperature difference between the mold arranged at the forward side and the mold arranged at the backward side is liable to be more significant during a period in which the molds are conveyed in the heating area and the cooling area. This is because when a glass lens having a larger diameter is produced, a mold having a larger volume needs to be used, and as a result, the mold has a larger heat capacity. In view of the foregoing, it is more effective that the manufacturing method for a glass molded body of this embodiment be used for manufacturing a glass lens having a diameter of 10 mm or more, and it is more preferred that the manufacturing method for a glass molded body of this embodiment be used for manufacturing a glass lens having a diameter of 20 mm or more. Further, a concave lens (an optical device having a concave shape) such as a concave meniscus lens and a biconcave lens has significant difference in thickness between the central part and the peripheral part, and hence temperature difference between molding surfaces of molds is liable to cause an error in shape between the concave lenses. However, the manufacturing method for a glass molded body of this embodiment can substantially eliminate the temperature difference between the mold arranged at the forward side and the mold arranged at the backward side and the temperature difference between molding surfaces of individual molds, and hence lenses can be manufactured with less error in shape. Note that, the upper limit of the diameter of each of the glass lenses to be manufactured is not particularly limited, but the upper limit is preferably 60 mm or less from the viewpoint of practical use.

Note that, it is only necessary that the arrangement order of the two molds arranged on the supporting surface of the support with respect to the conveying direction of the support be reversed at least once during a period in which the two molds are conveyed in the heating area and/or the cooling area. From the viewpoint of reliably reducing temperature fluctuation between the two molds, however, it is preferred that the arrangement order be reversed in the range of once to four times. Further, it is more preferred that the arrangement order of the two molds arranged on the supporting surface of the support with respect to the conveying direction of the support be reversed in both the heating step and the cooling step.

Further, the manufacturing method for a glass molded body of this embodiment at least includes a heating step of heating molds to soften a glass material contained in the molds, a press-molding step of press-molding the softened glass material, and a cooling step of cooling the press-molded glass material. However, the manufacturing method for a glass molded body of this embodiment may include other steps, and may include two kinds of cooling steps depending on the purposes thereof. For example, after the press-molding step, a cooling step (annealing step) intending to cool the glass material in the temperature range (glass transition temperature Tg or higher) in which the glass material is not solidified may be performed. After the annealing step, the press-molded glass material may be subjected to a re-press-molding step of re-press-molding the press-molded glass material for further improving the shape accuracy thereof, and then a cooling step (quenching step) intending to solidify the glass material may be performed.

In the annealing step, in order to prevent the situation that excessive cooling of the glass material increases the viscosity of the glass material, and hence it is difficult to perform the re-press-molding step as a subsequent step, as in the heating step, the two molds arranged on the supporting surface of the support, which is conveyed in one direction, specifically, one arranged at the forward side of the support in the conveying direction and the other arranged at the backward side of the support in the conveying direction, may be heated with heating members that are arranged along both sides of the conveying direction of the support so that the two molds can be heated from both sides of the conveying direction of the support. When the heating members are also used in the annealing step as mentioned above, the arrangement order of the two molds arranged on the supporting surface of the support located between the heating members (in the heating area) with respect to the conveying direction of the support may be reversed in the annealing step as well.

Further, in the heating step, it is only necessary to arrange at least one heating member on each of both sides of the conveying direction of the support. However, it is usually preferred that a pair of heating members having substantially the same size, shape, and heat generating amount be arranged on both sides of the conveying direction of the support. It is only necessary to arrange at least one pair of heating members as a set on one side and the other side of the conveying direction, and it is preferred to arrange two to four sets. That is, it is possible to adopt a structure in which the heating area is partitioned into a plurality of process chambers such as two to four process chambers and a predetermined temperature can be set for each process chamber. In this case, for example, different heating temperatures can be set for the respective pairs of heating members, thereby being able to carry out the temperature control of the molds more accurately and more easily. When, for example, three sets of a pair of heating members, that is, three heating areas (a rapid heating chamber 1, a rapid heating chamber 2, and a soaking chamber) are arranged along the conveying direction of the support, the heating step can be performed in the following three processes by using each of the heating areas: a first rapid heating process (rapid heating chamber 1) of rapidly heating the two molds; a second rapid heating process (rapid heating chamber 2) of heating the two molds under a higher temperature after the first rapid heating process; and a soaking process (soaking chamber) of reducing temperature fluctuation between the two molds after the second rapid heating process and adjusting the temperatures of the two molds to temperatures suitable for performing the press-molding step as a subsequent step. In this case, it is preferred that the arrangement order of the two molds arranged on the supporting surface of the support, which is sequentially conveyed through these three heating areas, with respect to the conveying direction of the support be reversed in each of the second rapid heating process and the soaking process.

Note that, it is preferred that the heating condition in the heating step be set so that the glass material has a viscosity of $10^6$ to $10^9$ dPa·s immediately before performing the press-molding step. Besides, in the annealing step, it is preferred that the temperature of the glass material after the press-molding step be controlled so that the temperature falls with time until reaching a temperature around the glass transition temperature Tg of the glass material.

Further, the shape of the support is not particularly limited as long as the support is structured so as to be able to support at least two molds, and the support may have, for example, a simple shape such as a disc shape. In this case, the upper surface of the support with a disc shape serves as a supporting surface. Alternatively, a base with a columnar shape or the like for arrangement of the molds may be provided on the upper surface of the support. In this case, the top surface of the base serves as a supporting surface.

Note that, in the above description, an aspect in which two molds are arranged at the forward side of the support in the conveying direction and the backward side of the support in the conveying direction, respectively, is mainly described in detail. However, the manufacturing method for a glass molded body of this embodiment may also be carried out similarly in an aspect in which three or more molds are arranged on the supporting surface of a support along a conveying direction of the support. When, for example, three molds are arranged on the support in the order of No. 1, No. 2, and No. 3 (ascending sequence) along the conveying direction of the support, the arrangement order of the molds can be changed to the order of No. 3, No. 2, and No. 1 (descending sequence) by rotating the support by 180 degrees. In this case, the arrangement order of the mold No. 1 and the mold No. 3 with respect to the conveying direction of the support for the molds is reversed, thus eliminating temperature difference attributed to difference in the arrangement positions of the molds. Meanwhile, the mold No. 2 remains in the position between the mold No. 1 and the mold No. 3 in both the cases of the ascending sequence and the descending sequence, but thermal influence from both sides of the conveying direction can be equalized by rotating the support by 180 degrees. Further, when four molds are arranged on the support in the order of No. 1, No. 2, No. 3, and No. 4 (ascending sequence), the arrangement order of the molds can be changed to the order of No. 4, No. 3, No. 2, and No. 1 (descending sequence) by rotating the support by 180 degrees.

(Manufacturing Apparatus for Glass Molded Body)

Next, a manufacturing apparatus for a glass molded body of this embodiment is described. The manufacturing apparatus for a glass molded body of this embodiment is not particularly limited as long as the manufacturing apparatus has a structure capable of carrying out the manufacturing method for a glass molded body of this embodiment. It is preferred that the manufacturing apparatus specifically have the following structure.

That is, it is particularly preferred that the manufacturing apparatus for a glass molded body of this embodiment include at least a heating part for heating a mold to soften a glass material contained in the mold, a press-molding part for press-molding the softened glass material, a cooling part for cooling the press-molded glass material, a support having a supporting surface for supporting a plurality of the molds thereon, and support conveying means for sequentially conveying the support to the heating part, the press-molding part, and to the cooling part, that the plurality of molds supported on the supporting surface be arranged along a conveying direction of the support, that the heating part include heating members arranged along both sides of the conveying direction of the support so as to be able to heat the plurality of molds from both the sides of the conveying direction of the support, and that the support be rotationally movable so as to reverse an arrangement order of the plurality of molds, which are supported on the supporting surface of the support, with respect to the conveying direction.

Note that, in the manufacturing apparatus for a glass molded body of this embodiment, process performing parts for performing the respective steps of the heating part for performing the heating step, the press-molding part for performing the press-molding step, and the cooling part for performing the cooling step may be arranged in the stated order, for example, in a straight-line direction or in a circumferential direction. Note that, when the latter arrangement aspect (circumferential arrangement) is adopted, in the manufacturing apparatus for a glass molded body of this embodiment, it is preferred that the support conveying means be a rotational table rotatable intermittently in one direction, that a plurality of supports be arranged at the outer peripheral side of the upper surface of the rotational table along a rotating direction of the rotational table, and that the heating part, the press-molding part, and the cooling part be at least arranged in the stated order along the rotating direction of the rotational table. Further, means for reversing the arrangement order of the plurality of molds arranged on the support with respect to the conveying direction is not particularly limited. For example, it is possible to use a rotational movement mechanism for rotating a support by 180 degrees with respect to a conveying direction of the support. In this case, the support is rotated in the horizontal direction by the rotational movement mechanism. The rotational operation in this case may be carried out in a state in which the support is spaced away from the support conveying means such as the rotational table or a state in which the support is in contact with the support conveying means, but it is more preferred that the rotational operation be carried out in the state in which the support is spaced away from the support conveying means such as the rotational table, from the viewpoint of, for example, the stability of the rotational operation. Further, the rotational movement mechanism is coupled to the drive shaft of a rotational machine installed inside or outside the manufacturing apparatus for a glass molded body.

FIG. 1 is a schematic plan view illustrating one example of the manufacturing apparatus for a glass molded body of this embodiment, and specifically illustrates a manufacturing apparatus for a glass molded body having a structure in which process performing parts (process chambers) for performing the respective steps are arranged in a circumferential direction. Herein, a manufacturing apparatus 10 for a glass molded body illustrated in FIG. 1 has a rotational table 20 as support conveying means, which includes a rotational shaft A and is rotatable intermittently in a counterclockwise rotating direction R1. Further, twenty supports 30 with a disc shape are arranged at equal intervals at the outer peripheral side of the upper surface of the rotational table 20 along the rotating direction R1 of the rotational table 20. Herein, each of the symbols P1 to P20, which are a combination of the alphabet "P" and the numbers and are placed in FIG. 1 in numerical order along the rotating direction R1, denotes the positions of the supports 30 in the state in which the rotational table 20 stops (hereinafter referred to as "support stop positions" in some cases) in a process in which the rotational table 20 intermittently rotates in the rotating direction R1 while repeating conveying (movement) and stop. Further, on each support 30, mold supporting parts 40A and 40B having a columnar shape are provided at the forward side and the backward side in a conveying direction M of the support 30, respectively, the conveying direction M being parallel to the rotating direction R1 and passing through a central axis X of the support.

Herein, two supports 30X (30) and 30Y (30) stop at the support stop positions P1 and P2, respectively, and two molds (not shown in FIG. 1) are placed on each of the two supports 30. Further, in the vicinity of the support stop positions P1 and P2, there is arranged loading/unloading means (not shown in FIG. 1) for loading, into the manufacturing apparatus 10 for a glass molded body, molds assembled outside the manufacturing apparatus 10 for a glass molded body, placing the molds on the supports 30 that stop at the support stop positions P1 and P2, and unloading, from the manufacturing apparatus 10 for a glass molded body, the molds that have undergone each predetermined process. Further, a pair of heating members 50 (plate-like heaters 50A and 50B) are arranged on both sides of the support stop positions P3 and P4 so as to be substantially line-symmetric along both sides of the conveying direction M. Pairs of heating members 51 to 56 (plate-like heaters 51A and 51B to 56A and 56B) are also arranged similarly on both sides of the subsequent support stop positions P5 to P16 so as to be substantially line-symmetric along both sides of the conveying direction M.

Further, the symbols S1 to S8 in FIG. 1 denote partition boards that are provided to maintain a temperature environment in each process performing part. Herein, the partition boards S1, S2, S3, S4, S5, S6, S7, and S8 are arranged between the support stop positions P2 and P3, between P4 and P5, between P6 and P7, between P8 and P9, between P10 and P11, between P12 and P13, between P14 and P15, and between P16 and P17, respectively. Further, the partition boards S1 to S8 each include a shutter mechanism that automatically opens and closes when the molds on each support 30 pass through each of the partition boards S1 to S8 along with the rotation of the rotational table 20. Note that, the partition board S4 between a heating part HT3 and a press-molding part PR may be omitted.

At a position immediately above the mold supporting parts 40A and 40B of two supports 30 that stop at the support stop positions P9 and P10, there is arranged pressing means (not shown in the figure) for pressing the upper surfaces of four molds placed on these supports 30. Further, at a position immediately above the mold supporting parts 40A and 40B of four supports 30 that stop at the support stop positions P13 to P16, there is arranged pressing means (not shown in the figure) for pressing the upper surfaces of eight molds placed on these supports 30. Besides, in the vicinity of the support stop positions P17 to P20, there is arranged cooling means (such as a nozzle for blowing a cooling gas) for quenching molds (not shown in the figure) placed on supports 30 that stop at these support stop positions.

Herein, each of the plate-like heaters 50A, 50B, 51A, 51B, 52A, 52B, . . . 56A, and 56B has an arc-like cross-sectional shape parallel to the conveying direction M in a plane parallel to the upper surface of the rotational table 20. Note that, in one pair of heating members 50, the plate-like heater 50B arranged at the outer peripheral side has substantially the same shape, size, and heat generating amount as the plate-like heater 50A arranged at the inner peripheral side, except that the plate-like heater 50B is longer in the direction parallel to the conveying direction M than the plate-like heater 50A. In addition, the same holds true for pairs of heating members 51 to 56. Further, the rotational table 20 rotates intermittently for every 36 degrees in the units of one set of two supports 30 adjacent to each other with respect to the rotating direction R1. That is, the supports 30X and 30Y sequentially move along the conveying direction M from a support stop position with an odd number (or even number) to a support stop position with the next odd number (or next even number) while repeating conveying and stop. Thus, in the manufacturing apparatus 10 for a glass molded body illustrated in FIG. 1, the press-molding step can be performed for four molds at the same time.

The manufacturing apparatus 10 for a glass molded body illustrated in FIG, 1 therefore includes, as the process performing parts, a loading/unloading part (LD/ULD) for performing a loading/unloading step of loading and unloading molded bodies at the position corresponding to the support stop positions P1 and P2, heating parts (HT1, HT2, and HT3) for performing heating steps at the positions corresponding to the support stop positions P3 to P8, the press-molding part (PR) for performing a press-molding step at the position corresponding to the support stop positions P9 and P10, a cooling part (annealing part) (SC) for performing an annealing step (cooling step) at the position corresponding to the support stop positions P11 and P12, re-press-molding parts (RPR1 and RPR2) for performing re-press-molding steps while performing annealing steps at the positions corresponding to the support stop positions P13 to P16, and cooling parts (quenching parts) (RC1 and RC2) for performing quenching steps (cooling steps) at the positions corresponding to the support stop positions P17 to P20. Herein, in each of the process performing parts, such processes as more specifically shown in. Table 1 can be performed.

TABLE 1

| Support stop position | Process performing part | Details of process |
|---|---|---|
| P1, P2 | LD/ULD | Loading/unloading step |
| P3, P4 | HT1 | Heating step (rapid heating process) |
| P5, P6 | HT2 | Heating step (rapid heating process) |
| P7, P8 | HT3 | Heating step (soaking process) |
| P9, P10 | PR | Press-molding step |
| P11, P12 | SC | Annealing step (cooling step) |
| P13, P14 | RPR1 | Re-press-molding step |
| P15, P16 | RPR2 | Re-press-molding step |
| P17, P18 | RC1 | Quenching step (cooling step) |
| P19, P20 | RC2 | Quenching step (cooling step) |

Herein, reversing of the arrangement order (reversing operation) of two molds with respect to the conveying direction M, the two molds being arranged on the mold supporting parts 40A and 40B of one support 30, respectively, is performed in at least one process performing part selected from the heating part HT1, the heating part HT2, the heating part HT3, the cooling part (annealing part) SC, the cooling part (quenching part) RC1, or the cooling part (quenching part) RC2. Further, the reversing operation may also be performed, if necessary, in other process performing parts than those listed above. However, in the aspect shown in Table 1, from the viewpoint of further reducing temperature fluctuation between the molds, it is preferred that the reversing operation be performed in the heating part HT2, the heating part HT3, and the cooling part (annealing part) SC. Note that, the manufacturing apparatus for a glass molded body of this embodiment is not particularly limited to the aspect illustrated in FIG. 1 as long as the manufacturing apparatus includes at least one heating part, at least one press-molding part, and at least one cooling part as the process performing parts. For example, the manufacturing apparatus 10 for a glass molded body illustrated in FIG. 1 may have a simplified structure in which the rotational table 20 includes a smaller number of supports 30 or may have a complicated structure in which the rotational table 20 includes a larger number of supports 30. Alternatively, the numbers of the heating steps, press-molding steps, annealing steps, re-press-molding steps, and quenching steps in the process performing parts may be appropriately increased or decreased. In this case, it is preferred that the angle of the intermittent rotation of the rotational table 20 be set to an appropriate angle depending on the number of the process performing parts.

Figure 2:
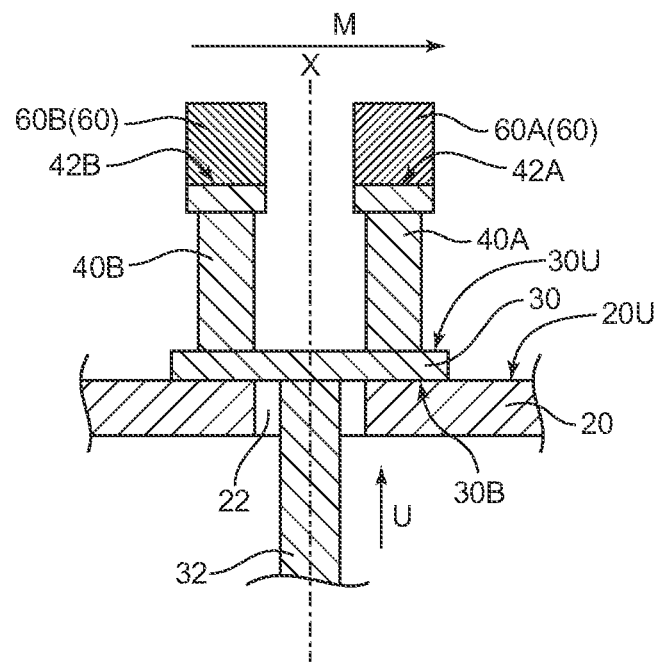
FIG. 2 is a schematic cross-sectional view illustrating a process in which a support is raised in a reversing operation in the manufacturing apparatus for a glass molded body illustrated in FIG. 1.
Figure 3:
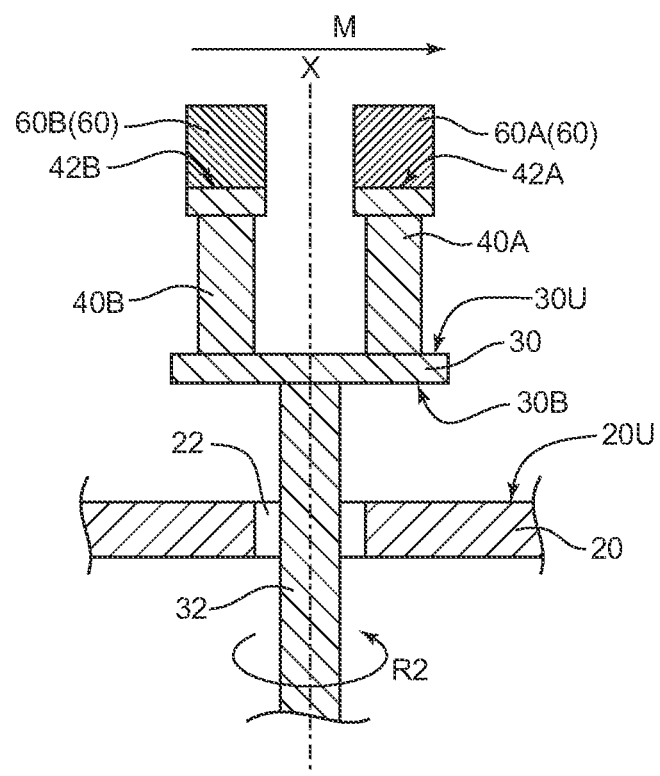
FIG. 3 is a schematic cross-sectional view illustrating a process in which the support is rotated in the reversing operation in the manufacturing apparatus for a glass molded body illustrated in FIG. 1.
Figure 4:
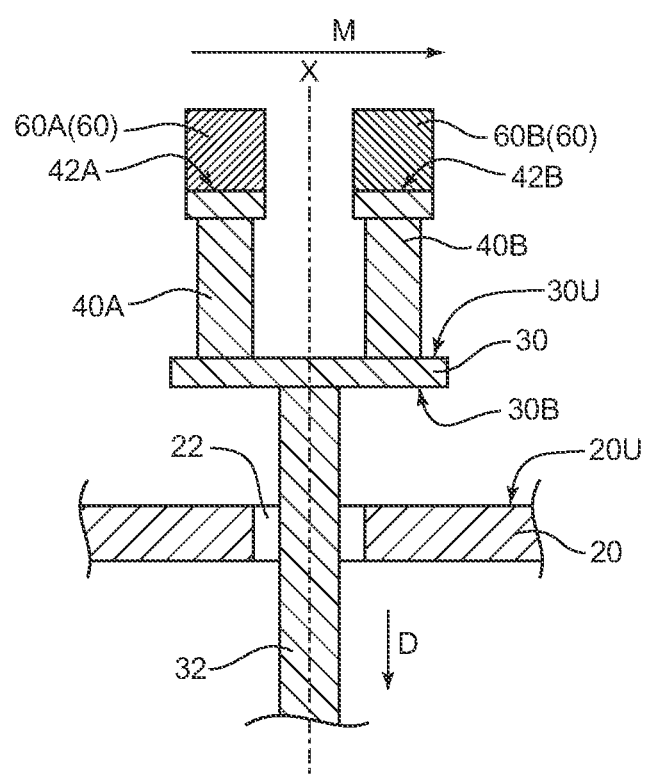
FIG. 4 is a schematic cross-sectional view illustrating a process in which the support is lowered in the reversing operation in the manufacturing apparatus for a glass molded body illustrated in FIG. 1.

Next, a specific example of the reversing operation in the manufacturing apparatus 10 for a glass molded body illustrated in FIG. 1 is described. FIG. 2 to FIG. 4 are schematic cross-sectional views illustrating one example of the reversing operation in the manufacturing apparatus 10 for a glass molded body illustrated in FIG. 1, and are views specifically illustrating a cross section of a plane substantially parallel to the conveying direction M in the vicinity of one support 30 in a state in which the rotational table 20 stops. Herein, in FIG. 2 to FIG. 4, the same symbols are given to the same components as those illustrated in FIG. 1.

As illustrated in FIG. 2, the rotational table 20 has a through-hole 22, and the support 30 arranged on an upper surface 20U of the rotational table 20 is arranged so as to close the through-hole 22. A bottom surface 30B of this support 30 is connected, via the through-hole 22, to a supporting pole 32 extending in the vertical direction. Herein, the support 30, the supporting pole 32, and the through-hole 22 have the same central axis (the alternate long and short dash line represented by the symbol X illustrated in the figure). Note that, the supporting pole 32, which structures part of the rotational movement mechanism together with a cam drive mechanism (not shown in FIG. 2 to FIG. 4) and the like, can be raised and lowered in the vertical direction and rotated in the horizontal direction. Meanwhile, on an upper surface 30U of the support 30, the mold supporting parts 40A and 40B each having a columnar shape are formed at the forward side and the backward side in the conveying direction M, respectively, so as to be point-symmetric with respect to the central axis X of the support 30 and the supporting pole 32. Further, molds 60A (60) and 60B (60) are arranged on top surfaces (supporting surfaces) 42A and 42B, respectively, of the mold supporting parts 40A and 40B.

When the reversing operation is carried out, the supporting pole 32 is first raised in an upward direction U, thereby moving the support 30 to the upward side of the rotational table 20 so as to be spaced away from the rotational table 20, and when the support 30 reaches a position with a predetermined height (for example, 2 mm to 50 mm) from the upper surface 20U of the rotational table 20, the support 30 stops moving in the upward direction (FIG. 2 and FIG. 3). Next, the supporting pole 32 rotates, thereby rotating The support 30 by 180 degrees in an arrow direction R2 about the central axis X as the rotation axis (FIG. 3). As a result, the mold supporting part 40A and the mold 60A both positioned, on the support 30, at the forward side with respect to the central axis X in the conveying direction M move to the backward side with respect to the central axis X in the conveying direction M, and the mold supporting part 40B and the mold 60B both positioned at the backward side with respect to the central axis X in the conveying direction M move to the forward side with respect to the central axis X in the conveying direction M (FIG. 4). After that, as illustrated in FIG. 4, the supporting pole 32 is lowered in a downward direction D, thereby lowering the support 30 to the position at which the bottom surface 30B of the support 30 comes into contact with the upper surface 20A of the rotational table 20. The resultant state is the same state as that illustrated in FIG. 2, except the reversed arrangement order of the mold 60A and the mold 60B with respect to the conveying direction.

Note that, the reversing operation illustrated in FIG. 2 to FIG. 4 is carried out by combining the three operations of raising, rotating, and lowering the support 30, but the raising and lowering operations may be omitted.

Further, it is preferred that, when the series of processes is completed and the rotational table 20 makes one full rotation, the arrangement order of the mold supporting parts 40A and 40B with respect to the conveying direction M (40A at the forward side with respect to the conveying direction and 40B at the backward side with respect to the conveying direction) in the loading/unloading part (LD/ULD) illustrated in FIG. 1 be the same as the arrangement order with respect to the conveying direction M before the series of processes.

Note that, in the manufacturing apparatus 10 for a glass molded body illustrated in FIG. 1, the rotational table 20 is intermittently rotated in the rotating direction R1 (counterclockwise direction) in the state in which the plurality of molds 60 containing a molding material 70 are held with the supports 30, thereby intermittently conveying the supports 30 to perform each step in each process performing part. However, each process performing part arranged along the rotating direction R1 may be arranged in the reverse direction against the rotating direction R1 in the configuration illustrated in FIG. 1, and the rotational table 20 may also be rotated in the reverse direction, thereby intermittently conveying the supports 30 in the reverse direction (clockwise direction) against the rotating direction R1.

Further, in the manufacturing apparatus 10 for a glass molded body illustrated in FIG. 1, the two supports 30 (30X and 30Y) as one set are simultaneously subjected to each process in the same process performing part. However, as the form of the process in one process performing part, in addition to the form that two supports 30 as one set are simultaneously processed, for example, the form that only one support 30 is processed may be adopted, or the form that three or more supports 30 as one set are simultaneously processed may be adopted.

—Mold—

Next, publicly-known molds can be used as molds that can be used for the manufacturing method for a glass molded body of this embodiment and the manufacturing apparatus 10 for a glass molded body of this embodiment. As the molds to be used, there are molds at least including an upper die and a lower die arranged to face each other in the vertical direction and a body die for supporting the upper die and the lower die on the same axis. Herein, a glass material is arranged between the upper die and the lower die when a glass molded body is manufactured.

Figure 5:
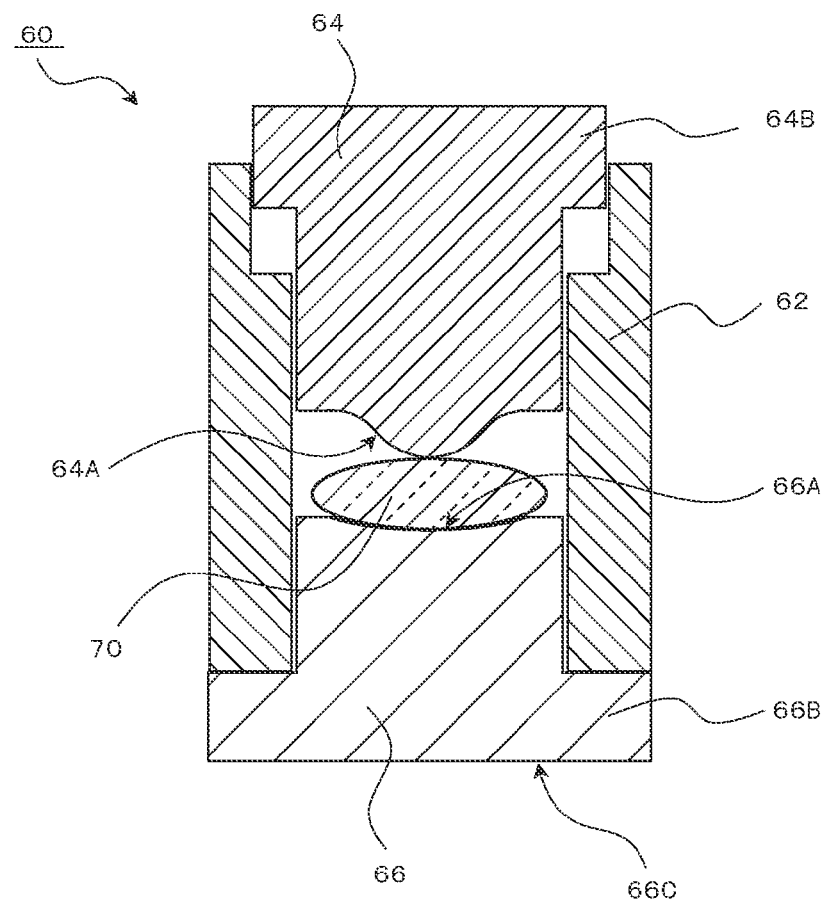
FIG. 5 is a schematic cross-sectional view illustrating one example of a mold to be used for a manufacturing method for a glass molded body according to the embodiment of the present invention and for the manufacturing apparatus for a glass molded body according to the embodiment of the present invention.

FIG. 5 is a schematic cross-sectional view illustrating one example of a mold to be used for the manufacturing method for a glass molded body of this embodiment and the manufacturing apparatus for a glass molded body of this embodiment, and is a view specifically illustrating a mold to be used for manufacturing a concave lens. The mold 60 illustrated in FIG. 5 includes a body die 62 having a cylindrical shape and an upper die 64 and a lower die 66 both fitted into the inner peripheral side of the body die 62 so that the molding surfaces of the upper die 64 and lower die 66 face each other. The glass material 70 (molding material) is arranged between the upper die 64 and the lower die 66. Herein, the upper die 64 is a columnar member having a molding surface 64A having a convex shape, and a flange part 64B having a ring shape is provided at the opposite side of the molding surface 64A. Herein, the molding surface 64A may be, for example, an aspherical surface. This upper die 64 is movable in the axis direction of the body die 62, and when press molding is performed, the surface on the side at which the flange part 64B is provided is pressed with a pressing member, thereby moving the upper die 64 toward the lower die 66. The lower die 66 is a columnar member having a molding surface 66A having a concave shape or a substantially flat surface shape, and a flange part 66B is provided at the opposite side of the molding surface 66A. Further, the glass material 70 illustrated in FIG. 5 is in a state before press molding and has a substantially disc-like shape. Note that, the mold 60 illustrated in FIG. 5 is a mold for producing a concave lens, and when production of a convex lens is intended, the molding surface 64 A thereof can be changed to a surface having a concave shape. When a glass molded body is manufactured, a bottom surface 66C of the lower die 66 in the mold 60 is arranged so as to come into contact with the top surfaces 42A and 42B of the mold supporting parts 40A and 40B. Then, when the press-molding step is performed, the glass material 70 softened by heating is press-molded with the upper die 64 and the lower die 66, and the shape of each of the molding surfaces 64A and 66A is precisely transferred to the glass material 70.

Any of publicly-known materials can be used without particular limitations as a material to be used for structuring the mold 60 as long as the publicly-known materials satisfy the three conditions of being suitable for enabling precise shaping depending on the shapes of glass molded bodies to be produced, of being suitable for enabling mirror finishing, and of achieving hardness and heat resistance sufficient for enduring press molding repeatedly. Examples of such materials include SiC, WC, TiC, TaC, BN, TiN, AlN, $Si_3N_4$, $SiO_2$, $Al_2O_3$, $ZrO_2$, W, Ta, Mo, a cermet, a sialon, a mullite, a carbon fiber, and a WC—Co alloy.

EXAMPLES

Next, the present invention is described by way of examples, but the present invention is not limited only to the following examples.

Example 1

When the process shown in Table 1 was performed in the manufacturing apparatus 10 for a glass molded body illustrated in FIG. 1, a reversing operation was carried out in both the heating part HT2 and the heating part HT3. In this case, evaluation was made on a temperature T1 of the mold 60A, a temperature T2 of the mold 60B, and a temperature difference $\Delta T(=|T1-T2|)$ immediately after completion of the heating process in each of the heating parts HT1, HT2, and HT3. Herein, the temperatures T1 and T2 mean, to be precise, values obtained by measurement with a thermocouple arranged in the vicinity of the top surfaces 42A and 42B of the mold supporting parts 40A and 40B. Further, the mold 60 used was a mold with a height of about 70 mm and a diameter of about 50 mm, for manufacturing a concave meniscus lens having a diameter of about 30 mm as a press-molded body and a diameter of 20 mm immediately after centering and shaping processing the outer peripheral part of the press-molded body.

Figure 6:
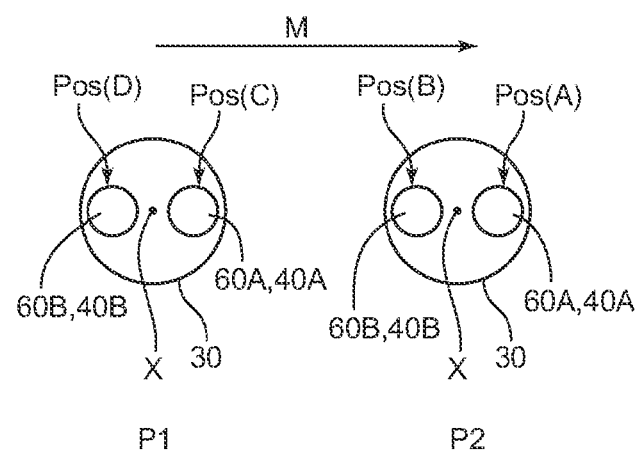
FIG. 6 is a plan view illustrating an arrangement relationship of four molds at support stop positions P1 and P2 in Example 1.
Figure 7:
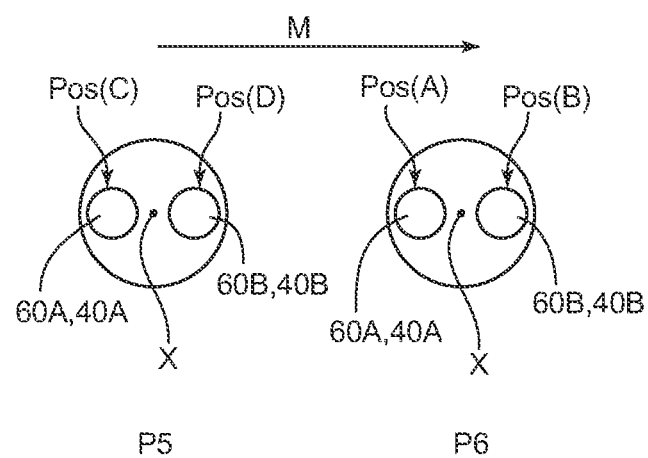
FIG. 7 is a plan view illustrating an arrangement relationship of the four molds after a reversing operation at support stop positions P5 and P6 in Example 1.

Note that, the temperatures T1 and T2 and the temperature difference $\Delta T$ were measured for two supports 30 adjacent to each other in the loading/unloading step. Specifically, as illustrated in FIG. 6, at the support stop position P2, the temperature of the mold 60A positioned at the forward side (hereinafter referred to as Pos(A)) in the conveying direction M was referred to as T1(A), the temperature of the mold 60B positioned at the backward side (hereinafter referred to as Pos(B)) in the conveying direction M was referred to as T2(B), and the absolute value of the difference between T1(A) and T2(B) was referred to as ΔT(A–B). Further, at the support stop position P1, the temperature of the mold 60A positioned at the forward side (hereinafter referred to as Pos (C)) in the conveying direction M was referred to as T1(C), the temperature of the mold 60B positioned at the backward side (hereinafter referred to as Pos(D)) in the conveying direction M was referred to as T2(D), and the absolute value of the difference between T1(C) and T2(D) was referred to as ΔT(C–D). Note that, FIG. 6 illustrates an arrangement relationship between two supports 30 stopping at the support stop positions P1 and P2 and the molds 60 placed on the supports 30. Thus, the arrangement order of Pos(A) and Pos(B) with respect to the conveying direction M and the arrangement order of Pos(C) and Pos(D) with respect to the conveying direction M are maintained until a first reversing operation is carried out at the support stop positions P5 and P6. On the other hand, after the first reversing operation is completed at the support stop positions P5 and P6, as illustrated in FIG. 7, the arrangement order of Pos(A) and Pos(B) with respect to the conveying direction M is reversed and the arrangement order of Pos(C) and Pos(D) with respect to the conveying direction M is reversed. That is, the molds are arranged in the order of Pos(B), Pos(A), Pos(D), and Pos(C) from the forward side to the backward side with respect to the conveying direction M. However, after a second reversing operation is completed at the support stop positions P7 and P8, as in the case illustrated in FIG. 6, the molds are arranged in the order of Pos(A), Pos(B), Pos(C), and Pos(D) from the forward side to the backward side with respect to the conveying direction M. As described below, Table 2 shows the measurement results of T1(A), T2(B), and ΔT(A–B), and Table 3 shows the measurement results of T1(C), T2(D), and ΔT(C–D).

TABLE 2

|  | After completion of heating process at heating part HT1 | After completion of heating process at heating part HT2 | After completion of heating process at heating part HT3 |
|---|---|---|---|
| Temperature T1(A) [° C.] at Pos(A) | 475 | 700 | 705 |
| Temperature T2(B) [° C.] at Pos(B) | 425 | 693 | 705 |
| ΔT(A − B) [° C.] | 50 | 7 | 0 |

TABLE 3

|  | After completion of heating process at heating part HT1 | After completion of heating process at heating part HT2 | After completion of heating process at heating part HT3 |
|---|---|---|---|
| Temperature T1(C) [° C.] at Pos(C) | 472 | 690 | 690 |
| Temperature T2(D) [° C.] at Pos(D) | 422 | 680 | 690 |
| ΔT(C − D) [° C.] | 50 | 10 | 0 |

Comparative Example 1

The heating process was performed for the molds 60 in the heating parts HT1, HT2, and HT3 under the same conditions as those in Example 1 except that no reversing operation was carried out, and T1 (A), T2(B), ΔT(A–B), T1(C), T2(D), and ΔT(C–D) were measured. Table 4 and Table 5 show the results.

TABLE 4

|  | After completion of heating process at heating part HT1 | After completion of heating process at heating part HT2 | After completion of heating process at heating part HT3 |
|---|---|---|---|
| Temperature T1(A) [° C.] at Pos (A) | 475 | 690 | 695 |
| Temperature T2(B) [° C.] at Pos(B) | 425 | 700 | 705 |
| ΔT(A − B) [° C.] | 50 | −10 | −10 |

TABLE 5

|  | After completion of heating process at heating part HT1 | After completion of heating process at heating part HT2 | After completion of heating process at heating part HT3 |
|---|---|---|---|
| Temperature T1(C) [° C.] at Pos (C) | 472 | 680 | 690 |
| Temperature T2(D) [° C.] at Pos(D) | 422 | 690 | 697 |
| ΔT(C − D) [° C.] | 50 | −10 | −7 |

Two reversing operations were carried out in Example 1, and hence ΔT(A–B) and ΔT(C–D) that had each shown 50° C. after completion of the heating process at the heating part HT1 were each significantly improved to 0° C. after completion of the heating process at the heating part HT3. Further, after completion of the heating process at the heating part HT3, a temperature difference among the four positions Pos (A) to Pos(D) was able to be suppressed to 0° C. Thus, in the concave meniscus lenses obtained after various processes were performed, the error in shape fell within one Newton ring with respect to an intended shape, and hence the concave meniscus lenses had extremely good surface accuracy and thickness accuracy.

On the other hand, in Comparative Example 1, in which no reversing operation was carried out, ΔT(A–B) and ΔT(C–D) that had each shown 50° C. after completion of the heating process at the heating part HT1 each showed 10° C. after completion of the heating process at the heating part HT3. That is, temperature fluctuation between Pos(A) and Pos(B) and that between Pos(C) and Pos(D) were not sufficiently improved. Further, after completion of the heating process at the heating part HT3, a temperature difference among the four positions Pos(A) to Pos(D) was 7° C., and the temperature fluctuation among the four positions was still significant. Thus, in some of the concave meniscus lenses obtained after various processes were performed, the error in shape was four or more Newton rings with respect to an intended shape, and hence the concave meniscus lenses had significant fluctuation in surface accuracy and thickness accuracy, thus resulting in reduction in production yield.

REFERENCE SIGNS LIST 10 manufacturing apparatus for glass molded body
20 rotational table (support conveying means)
20U upper surface
22 through-hole
30, 30X, 30Y support
30U upper surface
30B lower surface
32 supporting pole
40A, 40B mold supporting part
42A, 42B top surface (supporting surface)
50, 51, 52, 53, 54, 55, 56 pairs of heating members
50A, 50B, 51A, 51B, 52A, 52B, 53A, 53B, 54A, 54B, 55A, 55B, 56A, 56B plate-like heater
60, 60A, 60B mold
62 body die
64 upper die
64A molding surface
64B flange part
66 lower die
66A molding surface
66B flange part
66C bottom surface
70 glass material (molding material)

The invention claimed is:

1. A manufacturing method for a glass molded body, comprising at least the steps of:
   heating a plurality of molds each containing a glass material for molding to soften the glass material;
   press-molding the softened glass material; and
   cooling the press-molded glass material,
   the heating, the press-molding, and the cooling being performed while holding the plurality of molds with a support and conveying the plurality of molds in a constant direction,
   the heating comprising:
      heating the plurality of molds, which are arranged along a conveying direction of the support, with heating members arranged so as to be able to heat the plurality of molds from both sides of the conveying direction; and
      conveying the plurality of molds so as to reverse at least once an arrangement order of the plurality of molds, which are arranged on the support, with respect to the conveying direction by at least rotating the support holding the plurality of molds in a horizontal direction under a state in which the support is spaced away from support conveying means for conveying the support.

2. A manufacturing method for a glass molded body according to claim 1, wherein:
   the plurality of molds comprise two molds arranged on the support; and
   the manufacturing method further comprises rotating the support by 180 degrees with respect to the conveying direction so as to reverse the arrangement order of the two molds with respect to the conveying direction.

3. A manufacturing method for a glass molded body according to claim 1, wherein the reversing the arrangement order of the plurality of molds with respect to the conveying direction at least once is carried out in both the heating and the cooling.

4. A manufacturing method for a glass molded body according to claim 1, wherein the glass molded body comprises an optical device having a concave shape.

5. A manufacturing method for a glass molded body, comprising at least the steps of:
   heating a plurality of molds each containing a glass material for molding to soften the glass material;
   press-molding the softened glass material; and
   cooling the press-molded glass material,
   the heating, the press-molding, and the cooling being performed while holding the plurality of molds with a support and conveying the plurality of molds in a constant direction,
   the cooling comprising:
      cooling the glass material contained in each of the plurality of molds, which are arranged along a conveying direction of the support; and
      conveying the plurality of molds so as to reverse at least once an arrangement order of the plurality of molds, which are arranged on the support, with respect to the conveying direction by at least rotating the support holding the plurality of molds in a horizontal direction under a state in which the support is spaced away from support conveying means for conveying the support.

6. A manufacturing apparatus for a glass molded body, comprising at least:
   a heating part for heating a mold to soften a glass material contained in the mold;
   a press-molding part for press-molding the softened glass material;
   a cooling part for cooling the press-molded glass material;
   a support having a supporting surface for supporting a plurality of the molds thereon;
   support conveying means for sequentially conveying the support to the heating part, the press-molding part, and to the cooling part; and
   a rotational movement mechanism, wherein:
   the plurality of molds supported on the supporting surface are arranged along a conveying direction of the support;
   the heating part comprises heating members arranged along both sides of the conveying direction of the support so as to be able to heat the plurality of molds from both the sides of the conveying direction of the support; and
   the rotational movement mechanism is configured for rotating the support by 180 degrees with respect to the conveying direction of the support so as to reverse an arrangement order of the plurality of molds, which are supported on the supporting surface of the support, with respect to the conveying direction, the rotational movement mechanism being configured to rotate the support holding the plurality of the molds in a horizontal direction under a state in which the support is spaced away from the support conveying means.

7. A manufacturing apparatus for a glass molded body according to claim 6, wherein:
   the plurality of molds comprises two molds arranged on the supporting surface of the support at a forward side of the support in the conveying direction and a backward side of the support in the conveying direction; and
   the support is rotatable by 180 degrees with respect to the conveying direction so as to reverse the arrangement order of the two molds with respect to the conveying direction.

8. A manufacturing apparatus for a glass molded body according to claim 6, wherein:

the support conveying means comprises a rotational table rotatable intermittently in one direction;

the support comprises a plurality of supports arranged at an outer peripheral side of an upper surface of the rotational table along a rotating direction of the rotational table; and the heating part, the press-molding part, and the cooling part are at least arranged in the stated order along the rotating direction of the rotational table.

9. A manufacturing apparatus for a glass molded body according to claim 6, wherein the manufacturing apparatus for a glass molded body is used for manufacturing a glass lens having a concave shape.

* * * * *